Patented Jan. 10, 1933

1,893,802

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF PRODUCING PARA-CYMENE

No Drawing.  Application filed May 4, 1928.  Serial No. 275,263.

My invention relates to a method for the production of para-cymene, and more particularly relates to the production of para-cymene by the proper treatment of pine oil.

In accordance with my invention, I effect the producton of cymene by treatment of pine oil, or of a pine oil cut into which the terpineols are concentrated, with heat in the presence of a catalyst. As a result of the treatment polymerization products, oxygenated products and cymene $C_{10}H_{14}$, are produced. The cymene may be readily separated from the polymerization products by fractionation and it may also be separated by chemical treatment from other hydrocarbons, as para-menthane, $C_{10}H_{20}$, which may be formed.

In accordance with my invention I may effect the production of cymene by treatment of pine oil with heat and a catalyst, the treatment initially effecting dehydration of the pine oil with the production of terpenes, which finally are partially converted into cymene.

In accordance with my invention, I may utilize as a catalyst, for example, fuller's earth, kieselguhr, aluminum oxide, and the like, or activated carbon, or other neutral catalyst as a catalyst free from both acid and alkali and containing no free metal. The pine oil may be treated in either the liquid or vapor phase, and the catalyst will preferably be practically neutral.

In accordance with my invention the para-cymene, formed by the treatment of the tertiary alcohols of the pine oil, or of a pine oil cut, may be readily separated by fractionation from the higher boiling polymerization products formed by the treatment; and while the crude cymene on separation from the polymerization products may be generally used in place of pure cymene, for example, for solvent purposes, separation of the cymene from other products, as para-menthane and possibly small amounts of other saturated hydrocarbons formed by the treatment may be effected, for example, in the form of the barium salt of its sulfonic acid by sulfonation of the cymene with sulfuric acid by known methods, the menthane being unattacked, or separation may be effected by nitration of the crude cymene with mixed acid, since the cymene nitrates more readily than does the para-menthane.

In the carrying out of the method in accordance with my invention pine oil, or a pine oil cut in which the terpineols are concentrated, is subjected to treatment. The pine oil first undergoes dehydration, as by the splitting off of water from the tertiary alcohols of the pine oil, with the production of terpenes, which are then converted in part into higher polymers and in part into para-cymene and para-menthane.

The method according to my invention may be carried out in two steps, though it will be understood that the conversion may be effected in a single step.

For example, pine oil or a cut into which the terpineols are concentrated, as a cut boiling within about the range 210° C.–220° C., is first dehydrated, as by treatment with a dehydrator in the presence of heat. For example, the dehydration may be effected by heating the pine oil in the presence of fuller's earth, iodin and the like, which will be effective to dehydrate the tertiary alcohols of the pine oil without injuring the more valuable components, as borneol, fenchyl alcohol, anethol, etc. It will be understood that in treating the pine oil to effect dehydration, the dehydrator may be added to the pine oil or the pine oil may be vaporized and the vapors passed over a quantity of the dehydrator. For example, the dehydration may be effected by adding from about 1.0%–3.0% of fuller's earth to a quantity of pine oil which is then heated at a temperature within the range about 125° C.–225° C. for a period of say from about 0.5 hours to five hours. When iodin is used, the addition of about 0.1% will suffice. The terpenes derived from the tertiary alcohols as a result of dehydration will boil largely within the range about 170° C.–185° C. and may be readily separated by fractionation from the borneol, fenchyl alcohol, anethol, etc., constituents of the pine oil which may, if desired, be recovered by fractionation and refrigeration.

As a specific illustration, say 500 parts of pine oil are heated with 10 parts of fuller's earth at a temperature of about 160° C.–225° C. for four hours, the temperature being gradually raised. 305 parts of terpenes, along with some water are distilled off through a fractionating column, leaving a residue consisting chiefly of polymerized terpenes, borneol, fenchyl alcohol, anethol, etc., which may be separated, for example, by fractionation and crystallization.

The first step, i. e. dehydration of the pine oil, may be expressed as follows:

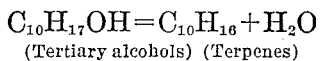
(Tertiary alcohols) (Terpenes)

In the second step say 305 parts of terpenes, b. p. 170° C.–185° C. are heated with 75 parts of fuller's earth at a temperature within about the range 160° C.–200° C. for a period of ten hours, either under atmospheric or up to about 60 pounds pressure. After the treatment is completed, about 125 parts of crude cymene is separated from a residual oil consisting chiefly of polymerized terpenes, by fractionation. The second step may be expressed as follows:

(Terpenes) (p-cymene) (p-menthane)

The crude product obtained according to the procedure outlined above will contain para-cymene, para-menthane and also polymerized terpenes. The polymerized terpenes may be eliminated by distilling off cymene and menthane, leaving the polymerized terpenes as a residue. Agitation during the conversion is preferable.

As has been indicated, if desired the conversion of pine oil, or of a pine oil cut, may be effected in one step, for example, by heating the pine oil with the fuller's earth, kieselguhr, or other neutral catalyst, as in the dehydration step above, but for a longer period, say about 20 hours, or by heating the pine oil with say 25% fuller's earth for say about 10 hours. When the conversion is effected in a single step, the distillate should be returned to the reaction vessel for more complete conversion into cymene. The conversion in a single step may be carried out, if desired, by heating the pine oil under a pressure, say within the range 15–125 pounds per square inch with about 25% fuller's earth, at a temperature around 170° C.–250° C. for 10 hours.

The method in accordance with my invention may be carried out with the pine oil either in liquid or vapor phase. The conversion in vapor phase may be effected, for example, by passing vapors of pine oil over fuller's earth heated to a temperature within about the range 200° C.–300° C.

The crude product produced in accordance with my process will, as has been indicated, comprise para-cymene, para-menthane, and polymerized terpenes and more specifically the product may contain about 25% para-cymene, 15% para-menthane, and 60% polymerized terpenes. The crude product will, on fractionation, yield a product boiling largely within the range 170° C.–195° C., having a specific gravity of about 0.846 at 15.6° C. and comprising para-cymene and para-menthane.

The crude product, as originally produced, may be utilized in general in place of cymene, but if it is desired to separate the cymene, such may be accomplished by treatment of the crude product, i. e. that boiling between about 170° C. and 195° C. with sulphuric acid for the production of the sulfonic acid of the cymene, which is easily separated from the unattacked menthane. For example, separation of the cymene may be effected by sulfonation of say 50 parts of the crude product with 100 parts of 100% sulfuric acid and separation of the barium salt subsequently produced. If desired, separation of the cymene from the crude cymene may be effected by nitration of the crude cymene with mixed acid, since the cymene will nitrate more readily than will the para-menthane.

According to my invention cymene is produced in a relatively simple and inexpensive manner, the product as produced being neutral and adapted for use in crude form or capable of being readily separated into para-menthane and cymene derivatives.

Having now fully described my invention, what I claim and desire to protect by Letters Patent is:

1. The method of producing para-cymene which includes heating pine oil in the presence of a neutral dehydration catalyst thereby effecting dehydration of the tertiary alcohols and continuing the treatment thereby effecting the conversion of a part of the product into para-cymene.

2. The method of producing para-cymene which includes heating pine oil in the presence of a neutral dehydration catalyst thereby effecting the production of terpenes and continuing the treatment thereby effecting conversion of terpenes into para-cymene.

3. The method of producing para-cymene which includes heating pine oil in the presence of fuller's earth thereby effecting dehydration of its tertiary alcohols and continuing the treatment thereby effecting the conversion by dehydrogenation of a part of the product into para-cymene.

4. The method of producing para-cymene which includes heating pine oil in the presence of a neutral dehydration catalyst thereby effecting dehydration of tertiary alcohols and conversion into cymene, fractionating the product and collecting the fraction boiling below about 190° C. and consisting in substantial part of para-cymene.

5. The method of producing para-cymene which includes heating pine oil in the presence of fuller's earth to effect dehydration of tertiary alcohols and conversion of terpenes to para-cymene, fractionating the product and collecting the fraction boiling below about 190° C. and consisting in substantial part of para-cymene.

6. The method of producing para-cymene which includes heating pine oil in the presence of a neutral dehydration catalyst thereby effecting dehydration of tertiary alcohols and conversion into cymene, fractionating the product, collecting the fraction boiling below about 195° C. consisting in substantial part of para-cymene and subjecting the fraction boiling below about 195° C. to treatment for the recovery of para-cymene.

7. The method of producing para-cymene which includes heating pine oil in the presence of a neutral dehydration catalyst to effect dehydration and conversion of terpenes to para-cymene, fractionating the product, collecting the fraction boiling below about 195° C. consisting in substantial part of para-cymene and subjecting the fraction boiling below about 195° C. to sulfonation for the separation of para-cymene.

8. A new product including in admixture para-cymene, para-menthane, polymerized terpenes and oxygenated pine oil components.

9. A new product including in admixture about 25% para-cymene, about 15% para-menthane and about 60% polymerized terpenes.

10. The method of producing para-cymene which includes subjecting pine oil to heat in the presence of fuller's earth thereby effecting production of terpenes and continuing the treatment thereby effecting the conversion of a part thereof into para-cymene.

11. In a method of preparing para-cymene the step which involves heating a terpene to a temperature of 170–250° C. in the presence of fuller's earth until conversion of a substantial part thereof into para-cymene is effected.

12. In a method of preparing para-cymene the step which involves heating dipentene to a temperature of 170° C.–250° C. in the presence of a neutral dehydration catalyst until conversion of a substantial part thereof into cymene is effected.

In testimony of which invention, I have hereunto set my hand, at Kenvil, New Jersey, on this 23rd day of April, 1928.

IRVIN W. HUMPHREY.